June 20, 1967 — L. L. GIBBES — 3,326,574

TRAILER HITCH

Filed Nov. 22, 1965

Inventor:
Louis L. Gibbes

By *(signature)*
his Attorney 3,326,574
TRAILER HITCH
Louis L. Gibbes, P.O. Box 1020,
Columbia, S.C. 29202
Filed Nov. 22, 1965, Ser. No. 509,127
5 Claims. (Cl. 280—501)

This invention relates to trailer hitches and has for its principal object the provision of a hitch which, by virtue of having a resilient connection with the towing vehicle, will minimize the tendency of the towed vehicle to sway.

The hitch illustrated and claimed is intended to be attached to a towing vehicle of the new Volkswagen model III type, in which rear engine automobiles the undercarriage is set in rubber and the hitch should therefore be provided with means for moving in conjunction with the chassis thereby keeping out side-sway.

A specific object of the invention is the provision of a towing hitch especially suited for use with such Squareback and Fastback models. With these automobiles there has been found a tendency for the towing ball support to move laterally, which movement, if allowed to accumulate, might cause damage.

An important object of the invention is to provide means to preclude the start of such vibration and to produce a new and important safety device making it possible for a model III Volkswagen to be driven with freedom from worry while towing a house trailer, a boat, or other towed vehicle.

A further object of the invention is to provide a hitch for a vehicle of the type in which the body and the running gear have between them a resilient member. In such case, if a hitch were to have a firm connection at the neck portion of the hitch, the advantages of the mounting between the body and the running gear would be lost. Consequently an important object of the invention is to provide a resilient support for the towing ball in order to dampen out incipient vibration while preserving all of the advantages of the mounting.

Figure 1:
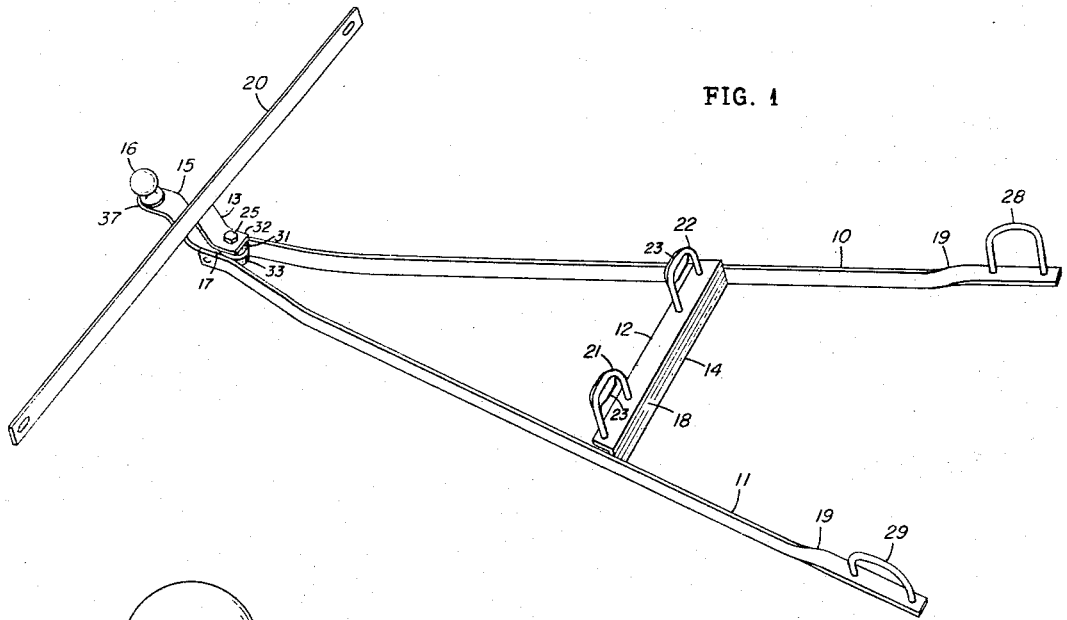
FIGURE 1 is a perspective view of the hitch.

As shown in FIGURE 1, the hitch consists primarily of two elongated arms 10 and 11 converging from front to rear, joined by an angle iron cross bar 14 and having a sturdy rear bracket 15 supporting the towing ball 16 and joining the arms at the neck 17 of the hitch together with a straight slight but important strap 20 which is adapted to be attached to the bumper bracket (not shown) using the same bumper bolts. The front portion of each arm is twisted 90 degrees as at 19 so that the front portion of the arm becomes horizontal to better engage by U-bolts 28 and 29 the torsion bar (not shown).

The angle iron 14 has a forward vertical flange 18 welded to the two arms 10 and 11. The other flange 12 of the transverse angle iron is horizontal. Since flange 18 is deeper than the height of the arms, and is flush with the bottoms of the arms, the horizontal flange 12 rises appreciably above the level of the top of the arms in order to hold all portions of the running gear well above the road surface and to insure that no portion of the towing vehicle will be interfered with. The U-bolts 21 and 22 preferably carry a flat strip of metal 23 securing the running gear of the towing vehicle (not shown) to the transverse crossbar 14 with minimum chance of injuring the cylindrical motor support tubes.

Inasmuch as the new Volkswagen types as stated use a yieldable connection between the chassis and the body of the car, it is essential that the trailer hitch be provided with means for moving in conjunction with the chassis. Hence, the connection between the straight strap 20 which is fast to the body of the towing vehicles and the sturdy bracket 15 holding the ball 16 must be such that the main bolt 25 shall be flexibly mounted in order to permit the hitch to "give" with the rubber mounted engine and transmission.

Figure 2:
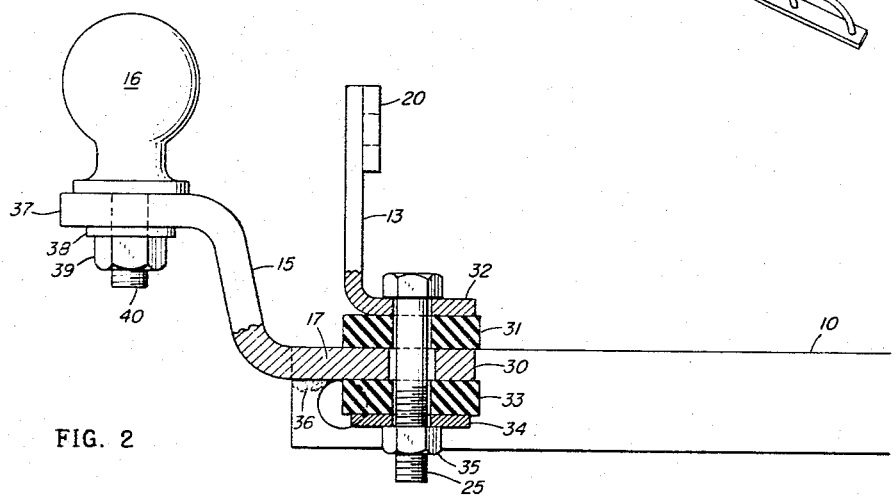
FIGURE 2 is a central longitudinal section through the rear bolt of the hitch, showing the rubber washers above and below the neck, these washers allowing the hitch to yield with the rubber mounted engine.

Referring to FIG. 2, the sturdy towing ball bracket 15 at its lower horizontal front end 30 engages a circular rubber washer 33 which is held in place on the main bolt 25 by a metal disk 34 and a nut 35. A similar washer 31 is placed above end 30 and below horizontal end 32 of light connection 13 welded to strap 20. The two washers are of solid rubber of about 2" diameter to fit snugly between the two elongated arms but fit the bolt loosely. By this construction the main bolt 25 is held steady but with freedom for the towing ball to be held resilient and avoiding side-slipping of the towed vehicle. If the hitch were firmly held to the body of the towing vehicle, the purpose of the rubber between the body and the running parts would be defeated. The function of the cross bar 20 and the washers is therefore to hold the ball 16 resiliently in place.

Figure 3:
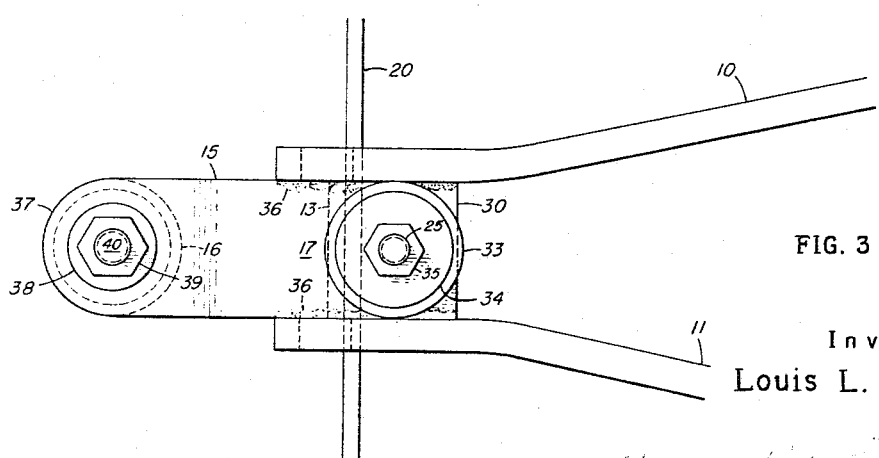
FIGURE 3 is a bottom view of the rear of the hitch.

As best seen in the bottom view of FIG. 3, the arms 10 and 11 are welded to the towing ball bracket 15 as at 36 with the upper flat smaller faces of the arms flush with the top surface of that portion of the ball bracket 15. The towing ball 16 is secured in usual manner to the upper rear horizontal portion 37 of its bracket by means of a washer 38 and a lock nut 39 on the threaded bolt 40 of the towing ball.

The hitch is attached to the towing vehicle at six points, that is, at U-bolts 21, 22, 27 and 28, for pulling, and at the two ends of cross bar 20 for positioning. At the seventh point, at the center of the bumper, the connection between the chassis and the body of the car is a flexible one.

What is claimed is:
1. A trailer hitch comprising
 (A) a pair of elongated arms converging from front to rear
 (B) fastening means at the forward portion of the arms adapted to secure the front of the hitch to the running gear of the towing vehicle
 (C) a transverse member located rearwardly of said fastening means, secured to the converging arms and having additional fastening means for securing the hitch to a different portion of the running gear of the towed vehicle
 (D) a bracket secured to the rear ends of the arms
 (E) a towing ball mounted on said bracket
 (F) an elongated strap mounted at the point of convergence of the elongated arms adapted to be secured to the body of the towing vehicle at spaced points thereon and
 (G) resiliently mounted means for holding the towing ball against incipient lateral movement with respect to the strap, whereby to avoid side-slipping of the wheels of the towed vehicle as the two vehicles round a curve.

2. The hitch of claim 1 in which the strap is secured to a vertically projecting member having a horizontal portion resiliently secured to the bracket.

3. The hitch of claim 2 in which the resiliently mounted means includes a vertically positioned bolt passing freely through the horizontal end of the connection and also freely through the ball-holding bracket.

4. The hitch of claim 3 in which flexible washers are mounted on the main bolt above and below the bracket.

5. The hitch of claim 4 in which the lower washer is of an outside diameter roughly equal to the space between the two elongated arms to fit snugly between them.

References Cited

UNITED STATES PATENTS

| | | | |
|---|---|---|---|
| 2,189,393 | 2/1940 | Fried | 280—495 X |
| 2,554,711 | 5/1951 | Lowman | 280—495 |
| 2,599,638 | 6/1952 | Huxford | 280—501 |
| 2,828,144 | 3/1958 | Hosmer | 280—495 X |
| 3,220,749 | 11/1965 | Mathisen | 280—501 X |
| 3,262,717 | 7/1966 | Neele | 280—501 |

BENJAMIN HERSH, *Primary Examiner.*

C. C. PARSONS, *Assistant Examiner.*